(12) United States Patent
Kim et al.

(10) Patent No.: US 7,433,328 B2
(45) Date of Patent: Oct. 7, 2008

(54) PACKET TRANSMISSION METHOD

(75) Inventors: Hak Seong Kim, Seoul (KR); Seung Hwan Won, Gyeonggi-do (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 618 days.

(21) Appl. No.: 11/031,211

(22) Filed: Jan. 7, 2005

(65) Prior Publication Data
US 2005/0180328 A1    Aug. 18, 2005

(30) Foreign Application Priority Data
Jan. 9, 2004    (KR) .................. 10-2004-0001608

(51) Int. Cl.
*H04B 7/005*    (2006.01)
(52) U.S. Cl. .................. 370/278; 370/328; 370/332; 714/748
(58) Field of Classification Search .......... 370/236, 370/278, 252, 328, 332; 714/748
See application file for complete search history.

(56) References Cited

U.S. PATENT DOCUMENTS

2003/0039217 A1* 2/2003 Seo et al. .............. 370/318
2003/0043758 A1* 3/2003 Jou ...................... 370/278
2003/0152031 A1* 8/2003 Toskala et al. .......... 370/236

FOREIGN PATENT DOCUMENTS

EP    1 326 361 A1    7/2003
WO    WO 02/47317 A1    6/2002

OTHER PUBLICATIONS

Atarashi H, et al.; "Broadband packet wireless access based on VSF-OFCDM and MC/DS-CDMA"; Personal, Indoor and Mobile Radio Communications, 2002. The 13th IEEE International Symposium on Sep. 15-18, 2002., Piscataway, NJ, USA, IEEE; Sep. 15, 2002; pp. 992-997; XP010611411; ISBN 0-7803-7589-0.

* cited by examiner

*Primary Examiner*—Seema S. Rao
*Assistant Examiner*—Sai-Ming Chan
(74) *Attorney, Agent, or Firm*—Lee, Hong, Degerman, Kang & Schmadeka

(57) ABSTRACT

A method of transmitting packet data using a HARQ transmission scheme for an uplink enables a mobile station in soft handover to determine an ACK or NACK condition reliably and accurately. The method includes receiving, from the N base stations, ACK/NACK signals indicating transmission acknowledgement status for an uplink packet; and transmitting a packet according to the number of ACK signals.

40 Claims, 6 Drawing Sheets

PACKET TRANSMISSION METHOD

This application claims the benefit of Korean Application No. 10-2004-0001608 filed on Jan. 9, 2004, which is hereby incorporated by reference.

BACKGROUND OF THE INVENTION

1. Field of the Invention

The present invention relates to an uplink packet transmission method in a mobile communication system, and more particularly, to a method of performing uplink packet transmission in a mobile station communicating with at least two base stations generating ACK/NACK signals according to a hybrid automatic repeat request (HARQ) scheme.

2. Discussion of the Related Art

Hybrid automatic repeat request (HARQ) scheme applies channel coding to an automatic repeat request (ARQ) scheme. In ARQ scheme, a transmitting end transmits packet to a receiving end, and receives an acknowledgement (ACK) or negative acknowledgement (NACK) according to status of receiving and decoding in the receiving end.

Therefore, in a mobile communication system supporting a HARQ scheme, the receiving end, e.g., a base station, generates the ACK/NACK signal to indicate a packet transmission acknowledgment status based on the reception and decoding status of a corresponding packet, so that the transmitting end, e.g., a mobile station or user equipment (UE), is conditionally informed of the need to retransmit reverse traffic data. That is, the base station transmits an ACK signal if retransmission is unnecessary, i.e., when the transmitted signal is successfully received and decoded, and transmits a NACK signal if retransmission is necessary, i.e., when the transmitted signal is unsuccessfully received or decoded.

A HARQ system stores a previously received packet in which decoding has failed, combines the stored packet with a retransmission packet which is retransmitted in response to a NACK signal, and then performs an additional decoding operation on the combined resultant. In doing so, diversity gain and coding gain can be increased over a system. In addition, while the HARQ system uses physical layer signaling in transmitting an ACK/NACK signal and therefore exhibits minimal transmission delay, the ARQ system suffers from higher transmission delay times since ACK/NACK signals are transmitted by upper layer signaling.

HARQ is also applicable to a case of uplink packet transmission as well as downlink packet transmission. When a user equipment (UE) communicates with several base stations, such as in a soft handover condition, base station decides a presence or non-presence of error occurrence for a transmitted packet and then transmits a downlink ACK/NACK signal. In doing so, if each of the base stations transmits the ACK/NACK signal to the user equipment, the user equipment detects the ACK/NACK signal for each of the base stations.

The user equipment determines ACK or NACK for each of the base stations respectively, but uplink power control is performed with the combined power from all of the base stations. Therefore, each downlink reception power or signal to Interference ratio (SIR) may vary unstably, and the transmitting power for ACK/NACK signals needs high value excessively.

SUMMARY OF THE INVENTION

Accordingly, the present invention is directed to an uplink packet transmission method in a mobile communication system that substantially obviates one or more problems due to limitations and disadvantages of the related art.

An object of the present invention is to provide a method of performing packet transmission using a HARQ scheme, in which a mobile station communicating with at least two base stations receives feedback information indicating a decoding success or failure of an uplink packet, to determine an ACK or NACK condition for controlling further packet transmission.

An object of the present invention is to provide a method of performing packet transmission using a HARQ scheme, which minimizes the number or rate of false ACK signal detections when discontinuous transmission (DTX) is used to indicate a NACK condition, so that a threshold can be lowered to enable a reduction in ACK/NACK transmission signal power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of transmitting a packet from a mobile station. The method comprises receiving, from the N base stations, ACK/NACK signals indicating transmission acknowledgement status for an uplink packet; and transmitting a new packet or a retransmission packet according to the number of ACK signals.

Preferably, the number of ACK signals is less than a predetermined value, the retransmission packet is transmitted.

In another aspect of the present invention, there is provided a method of transmitting a packet from a mobile station. The method comprises receiving, from the N base stations, ACK/NACK signals indicating transmission acknowledgement status for an uplink packet; measuring an ACK/NACK reception level from each of the N base stations; selecting at least a base station among the N base stations according to the measured ACK/NACK reception level; and transmitting a new packet or a retransmission packet according to the number of the base station(s) transmitted ACK signal among the selected base stations.

In another aspect of the present invention, there is provided a method of transmitting a packet from a mobile station. The method comprises receiving, from the N base stations, ACK/NACK signals indicating transmission acknowledgement status for an uplink packet; measuring an ACK/NACK reception level from each of the N base stations; selecting at least a base station comparing the reception level of each N base station with a threshold; and transmitting a new packet or a retransmitting packet according to the number of the base stations transmitted ACK signal among the selected base stations.

In another aspect of the present invention, there is provided a method of transmitting a packet from a mobile station. The method comprises receiving, from the N base stations, ACK/NACK signals indicating transmission acknowledgement status for an uplink packet; measuring an ACK/NACK reception level from each of the N base stations; determining whether at least a base station from which the reception level is greater than or equal to a threshold; and transmitting a retransmitting packet when the reception level of all base stations below the threshold.

In another aspect of the present invention, there is provided a method of transmitting a packet from a mobile station. The method comprises determining ACK/NACK status of at least one base station for an uplink packet, based on reception level from each of at least one station; and transmitting a packet according to the number of ACK status.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, like reference numbers will be used throughout the drawings to refer to the same or similar parts.

When transmitting uplink packet data via an enhanced dedicated channel in a mobile communications 3GPP standard system using HARQ scheme, a UE in soft handover may, for a single uplink transmission packet, receive different ACK/NACK signals from a plurality of base stations. Meanwhile, it should be appreciated that in performing soft handover with a plurality of base stations, a single UE simultaneously transmits a specific uplink packet to base stations and receives a corresponding ACK or NACK signal from each base station, which generates the downlink ACK or NACK signal to the UE according to decoding results. That is, in transmitting an uplink packet to one of the base stations, an independent ACK or NACK signal is generated.

In a HARQ scheme, a reception error for the transmitted ACK/NACK signal may occur in either of two conditions. The UE may recognize an ACK signal as a NACK signal or recognize a NACK signal as an ACK signal. The first case results in an unnecessary retransmission but causes little problem other than a slight waste of radio resources. On the other hand, the UE may recognize a NACK signal as an ACK signal, which is a more serious problem since the UE would then delete from a buffer the previously transmitted packet and proceed directly with a transmission of the next (new) packet. Thus, while a false NACK results in a mere system redundancy, a false ACK results in packet loss. Though packet loss is recoverable, there are delays in transmission and reception since a higher layer of the network is required. Therefore, a stable reception of NACK signals is more important than that of ACK signals.

Figure 1:
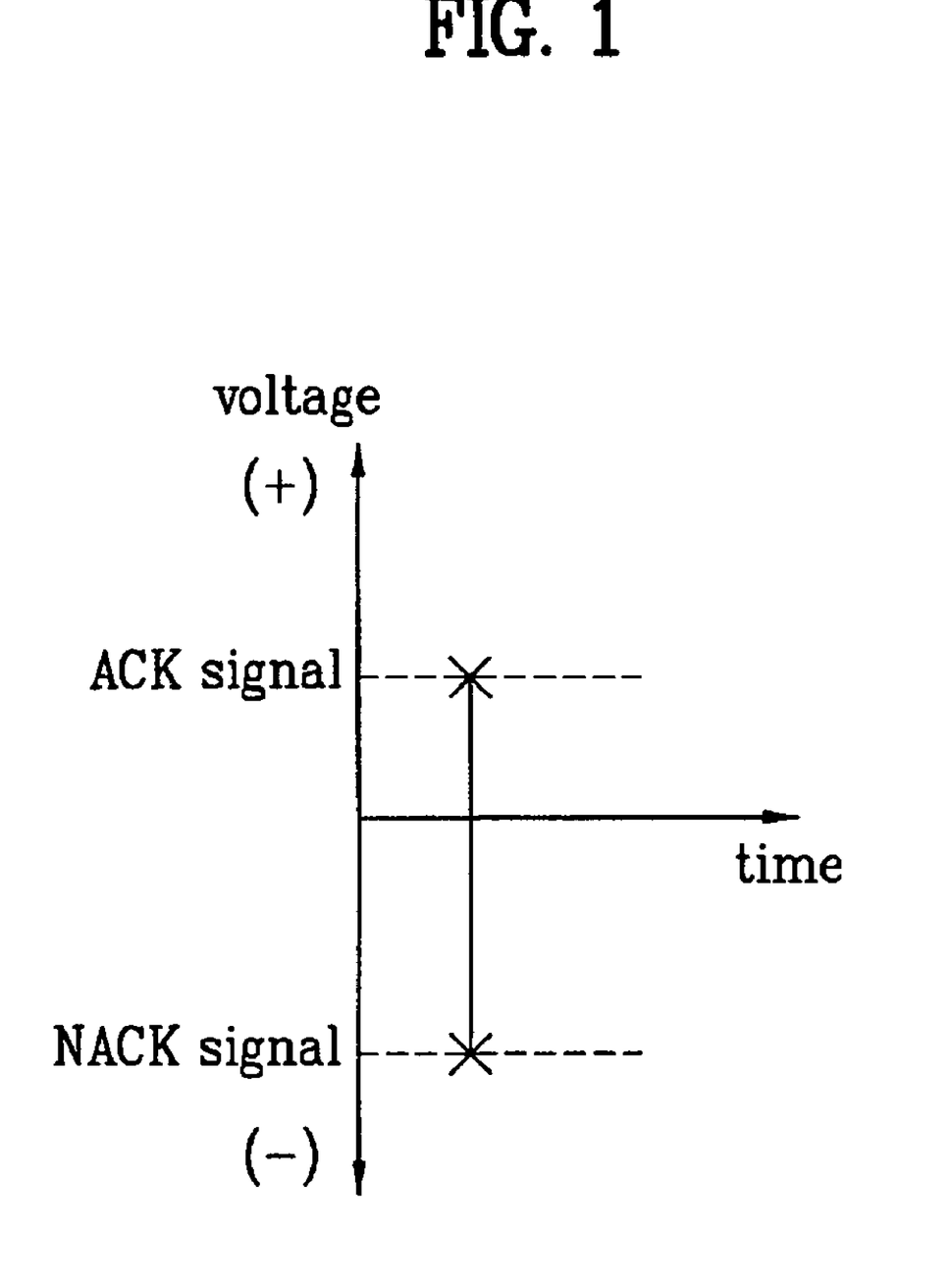
FIG. 1 is a diagram of a conditional transmission of ACK/NACK signals.

Referring to FIG. 1, both ACK and NACK signals are transmitted via binary phase-shift-keying (BPSK) modulation. A base station transmits a downlink ACK signal if an uplink packet is successfully received and decoded. And, the base station transmits a downlink NACK signal if the uplink packet is unsuccessfully received and decoded. Here, it should be noted that NACK signal transmission power is higher than ACK signal transmission power, since, as demonstrated above, the stable reception of NACK signals is more important than that of ACK signals.

Figure 2:
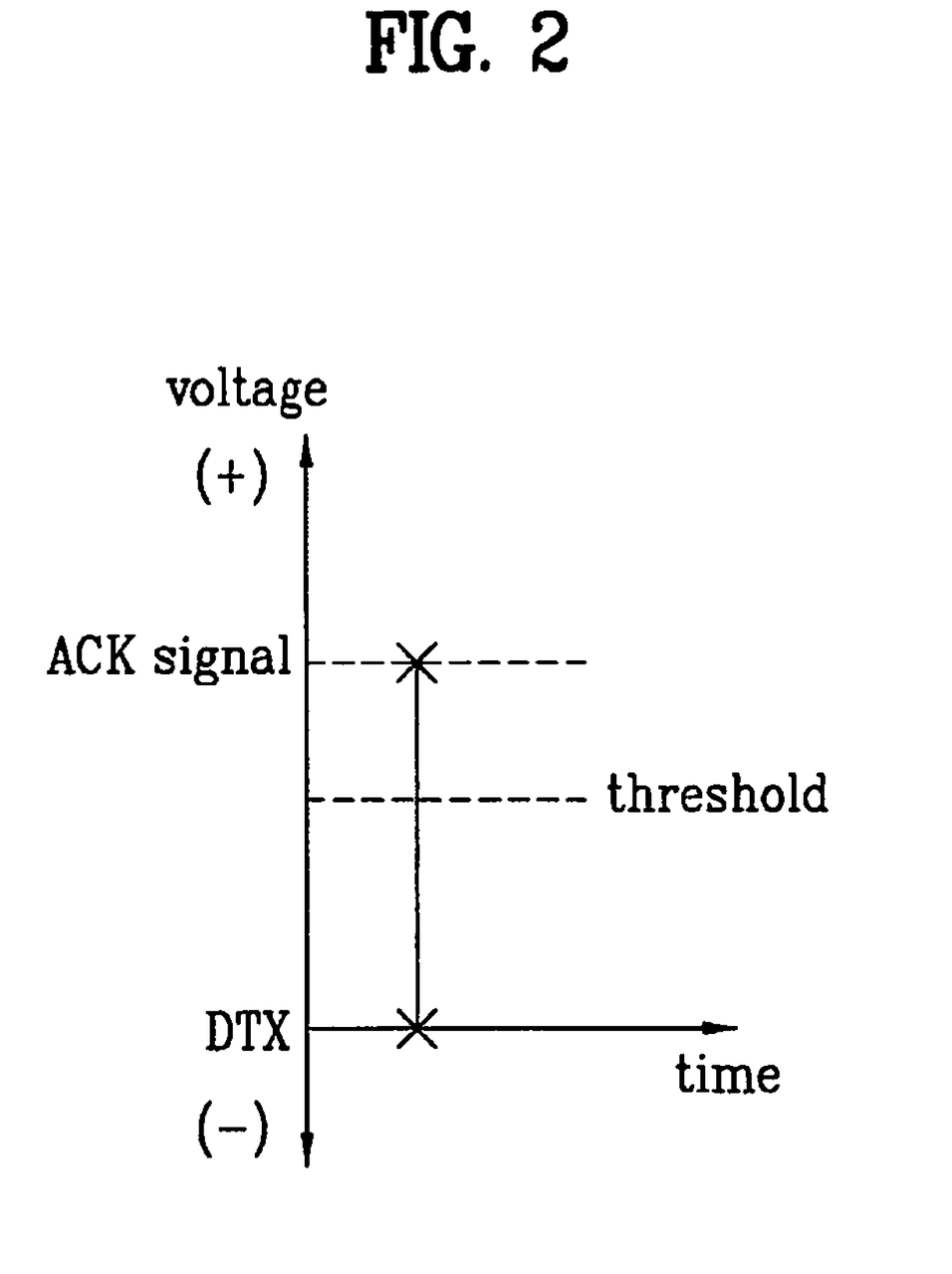
FIG. 2 is a diagram of a conditional transmission of ACK/NACK using a discontinuous transmission technique.

Referring to FIG. 2, the information indicating NACK is transmitted using a discontinuous transmission (DTX) technique. Here, a base station transmits a downlink ACK signal if an uplink packet is successfully received and decoded but transmits no downlink NACK signal even if there is a failure in packet reception or the decoding of a received packet. When communicating with a base station using such a technique, a UE employs a specific filter, which is matched to the ACK signal. At a point of time when ACK/NACK feedback is anticipated, if output of the filter exceeds a predetermined threshold, the UE determines a ACK condition.

For output levels less than the threshold, the UE determines a NACK condition. The threshold is set according to NACK decision reliability requirements and is increased for higher reliability requirement, in which case ACK transmission power is also raised to meet the corresponding requirements for an ACK decision.

Figure 3:
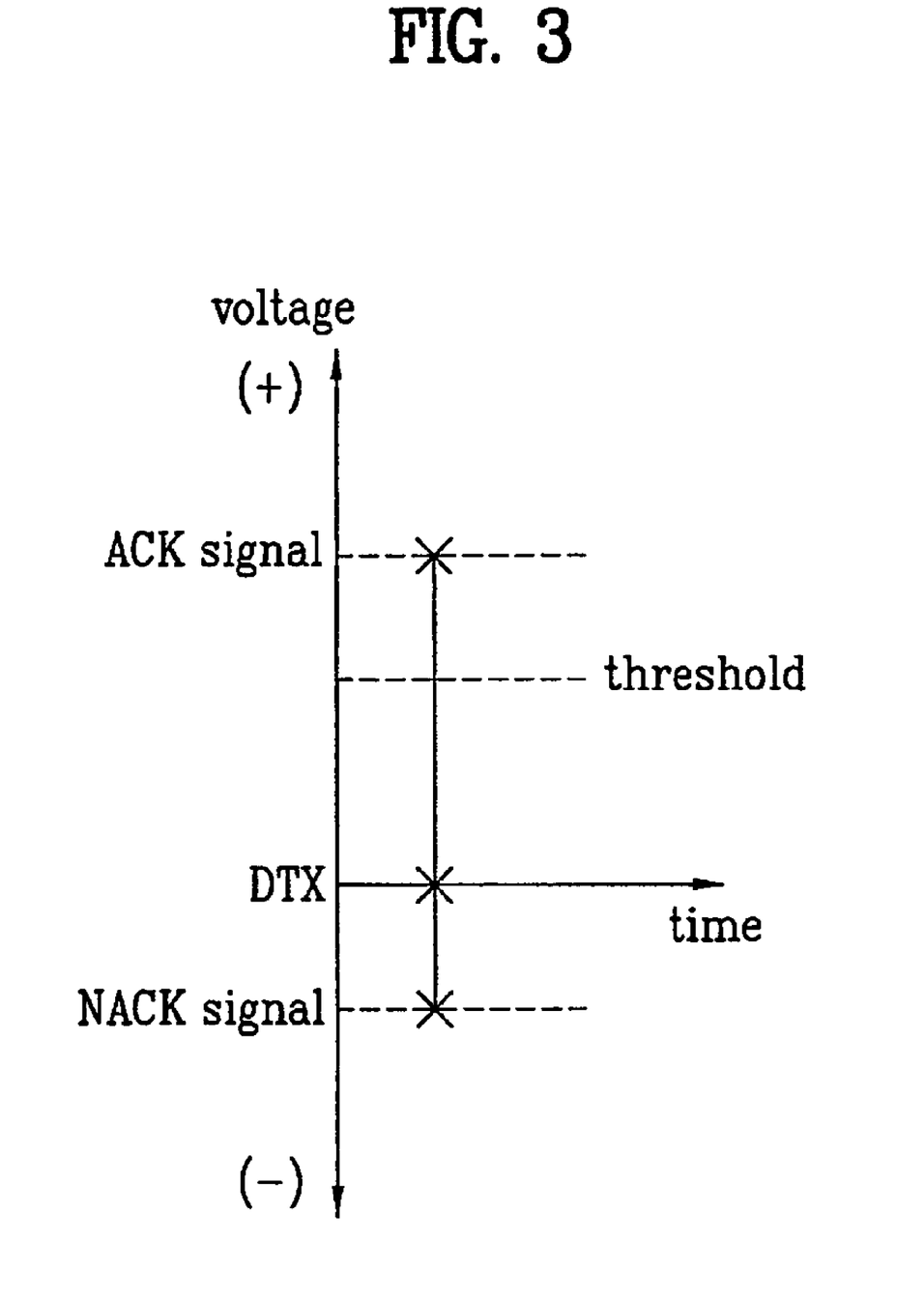
FIG. 3 is a diagram of a conditional transmission of ACK/NACK using a discontinuous transmission technique including NACK signal transmission.

Referring to FIG. 3, illustrating yet another type of conditional transmission of ACK/NACK information, a base station applies the DTX technique when failing to receive a packet but transmits a NACK signal when failing to decode a received packet. That is, a base station transmits a downlink ACK signal if an uplink packet is successfully received and decoded, transmits a downlink NACK signal if the uplink packet is successfully received but unsuccessfully decoded, and applies discontinuous transmission (i.e., transmits no downlink ACK or NACK signal) in cases where there is no recognition of the presence of a received uplink packet. As in the case of the conditional transmission explained with reference to FIG. 2, the UE determines an ACK condition based on the output of the specific filter compared to a predetermined threshold for determining an ACK or NACK condition, determining a NACK condition for output levels less than the threshold. Here, too, the threshold is set according to NACK decision reliability requirements and is increased for higher reliability requirement, in which case ACK transmission power is also raised to meet the corresponding requirements for an ACK decision.

Figure 4:
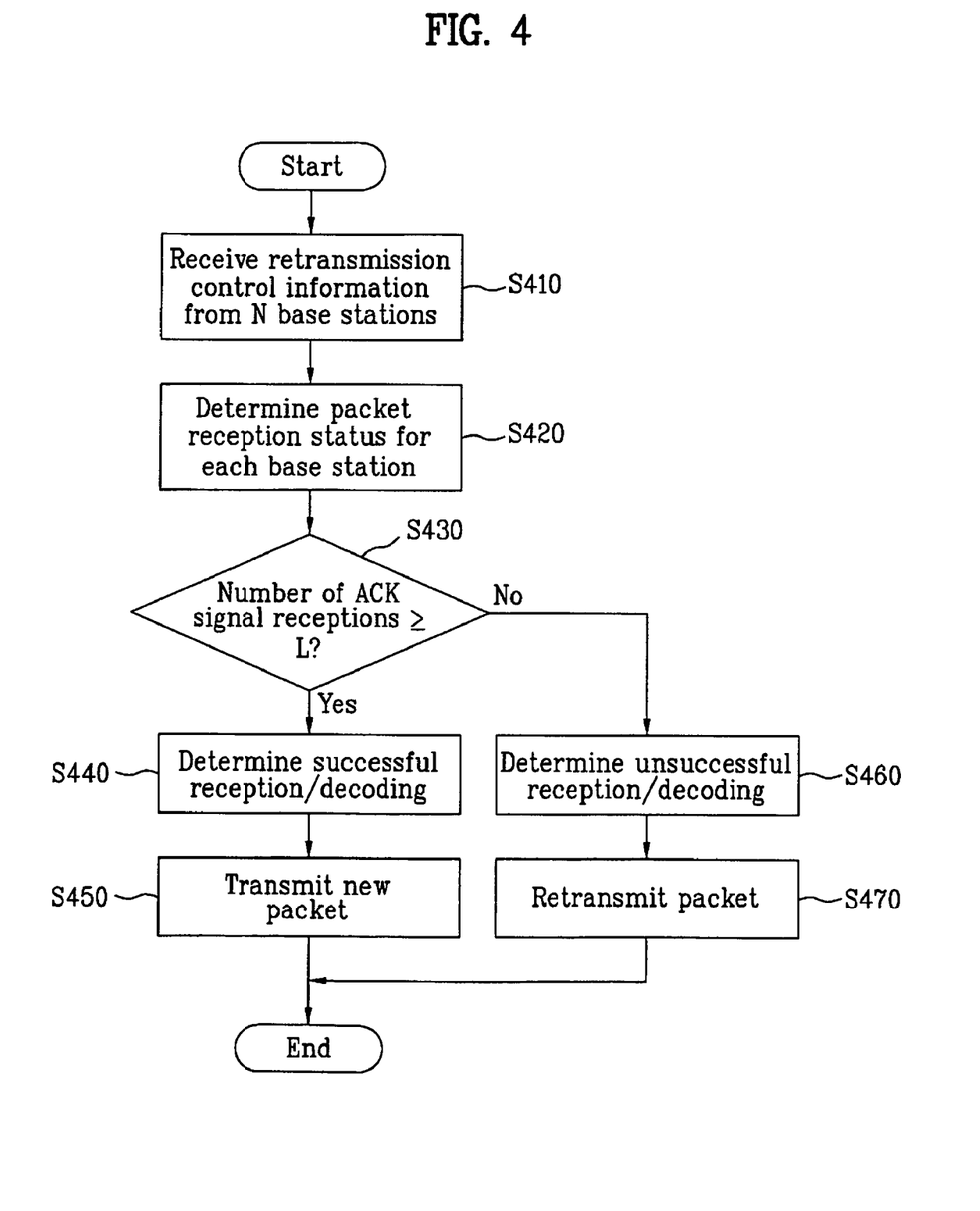
FIG. 4 is a flowchart of a packet transmission method according to a first embodiment of the present invention.

Referring to FIG. 4, illustrating a packet transmission method according to a first embodiment of the present invention, it is assumed that a UE in soft handover has transmitted a specific packet while in communication with more than one base station. In response to such transmission, the UE receives downlink ACK or NACK signals, from a plurality N of base stations (S410), determines a packet reception status for each base station (S420), and counts the ACK signals. That is, the UE decides whether the receiving signal, transmitted according to the reception status of each base station, is to be processed as an ACK signal or a NACK signal and then counts the signals determined to be an ACK signal. The counted number is then compared to a predetermined value L (S430), and if the count meets or exceeds the value of L, the UE determines that the transmitted packet has been successfully decoded by the corresponding base station (S440) and then transmits a new uplink packet (S450). On the other hand, if the count is less than the value of L, the UE determines that the corresponding base station has unsuccessfully decoded the transmitted packet (S460) and then retransmits the packet (S470).

Assuming for instance that the value of L is set to "1" (L=1), if the UE determines that the receiving signal from any one of the bases stations is an ACK signal, it is determined that the transmitted packet has been successfully decoded, in which case the UE transmits a new packet. Conversely, if the UE determines that there is no ACK signal received from any of the bases stations, it is determined that the transmitted packet has been unsuccessfully decoded, in which case the UE retransmits the corresponding packet.

Figure 5:
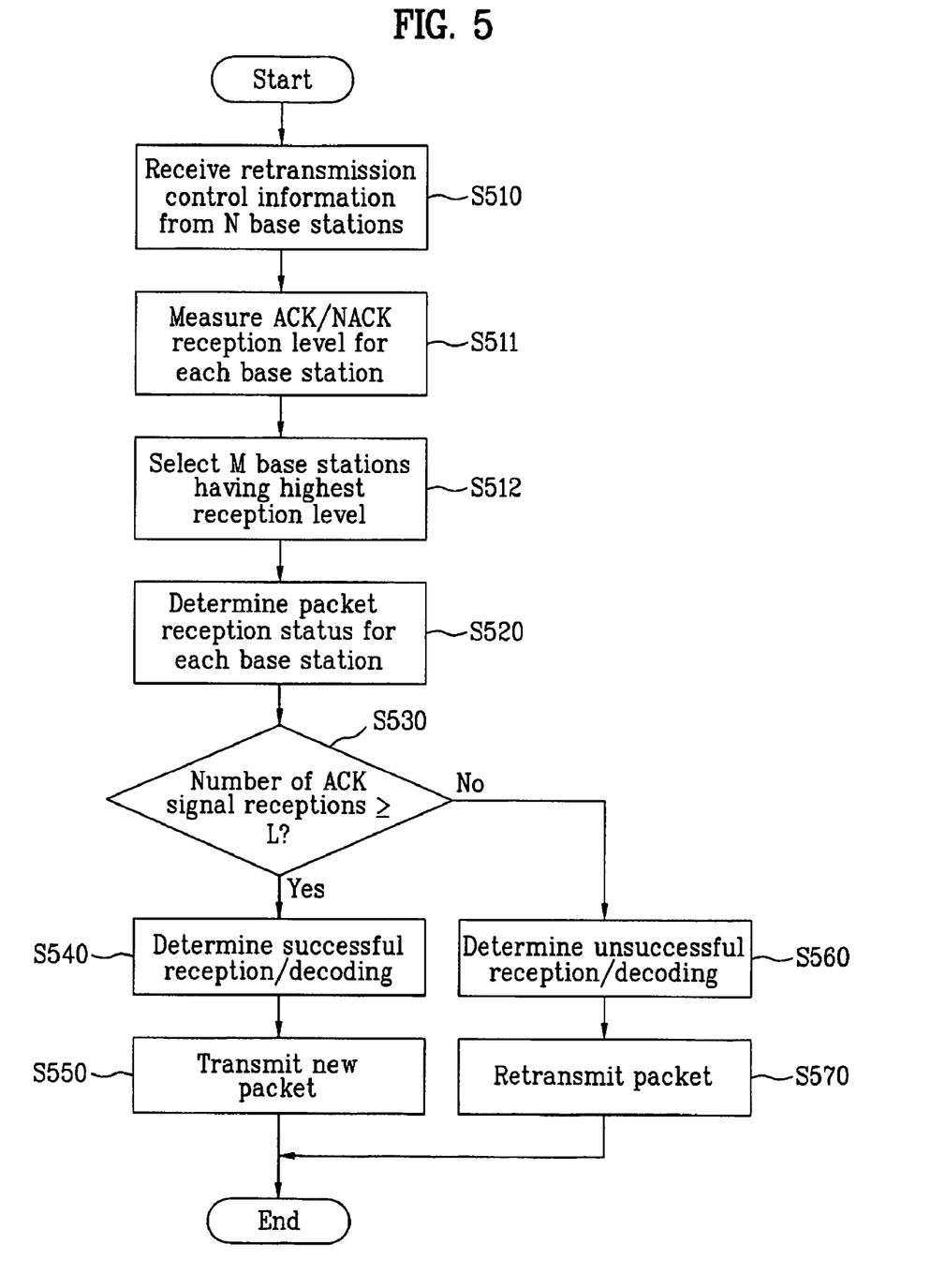
FIG. 5 is a flowchart of a packet transmission method according to a second embodiment of the present invention.

Referring to FIG. 5, illustrating a packet transmission method according to a second embodiment of the present invention, it is similarly assumed that a UE in soft handover has transmitted a specific packet while in communication with more than one base station. In response to such transmission, the UE receives downlink ACK or NACK signals, from a plurality N of base stations (S510). In this embodiment, the UE measures the downlink ACK/NACK reception level, i.e., power level or signal to interference (SIR) from each of the N base stations (S511), selects M base stations having the highest reception level, i.e., power level or SIR, among the N base stations (S512), determines a packet reception status for each selected base station (S520), and counts the ACK signals according to the selection. That is, the UE decides whether the receiving signal, transmitted according to the reception status of each base station, is to be processed as an ACK signal or a NACK signal and then counts the signals determined to be an ACK signal. Thereafter, as in the case of the first embodiment, the counted number is then compared to a predetermined value L (S530), and if the count meets or exceeds the value of L, the UE determines that the transmitted packet has been successfully decoded by the corresponding base station (S540) and then transmits a new uplink packet (S550); if the count is less than the value of L, the UE determines that the corresponding base station has unsuccessfully decoded the transmitted packet (S560) and then retransmits the same packet (S570).

Figure 6:
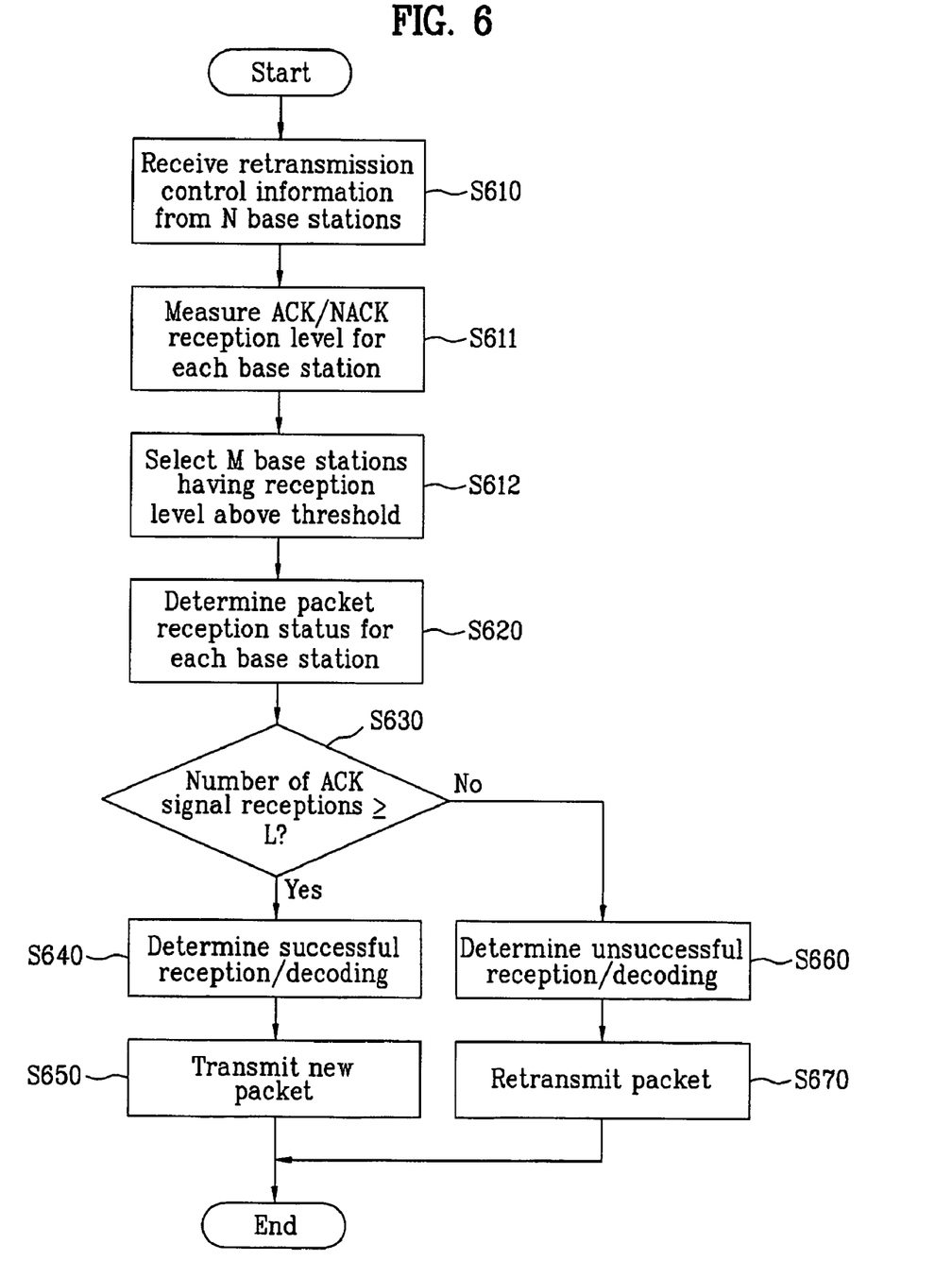
FIG. 6 is a flowchart of a packet transmission method according to a third embodiment of the present invention.

Referring to FIG. 6, illustrating a packet transmission method according to a third embodiment of the present invention, it is again assumed that a UE in soft handover has transmitted a specific packet while in communication with more than one base station. In response to such transmission, the UE receives downlink ACK or NACK signals, from a plurality N of base stations (S610), measures the downlink ACK/NACK reception level, i.e., power level or Signal to Interference Ratio (SIR) from each of the N base stations (S611), selects M base stations, preferably all base stations, from which the reception level, i.e., power level or SIR, has a level greater than or equal to the threshold among all N base stations (S612), determines a packet reception status for each selected base station (S620), and counts the ACK signals according to the selection. In this embodiment, however, the measured ACK/NACK reception level, i.e., power levels or SIRs are compared to a threshold, those having an ACK/NACK reception level below the threshold are excluded, such that the counted number of ACK signals directly corresponds to the base stations from which an ACK signal is received at a level greater than or equal to the threshold. Thereafter, as in the case of the first and second embodiments, the counted number is then compared to a predetermined value L (S630), and if the count meets or exceeds the value of L, the UE determines that the transmitted packet has been successfully decoded by the corresponding base station (S640) and then transmits a new uplink packet (S650); if the count is less than the value of L, the UE determines that the corresponding base station has unsuccessfully decoded the transmitted packet (S660) and then retransmits the same packet (S670).

In the method of the present invention according to each of the first to third embodiments (FIGS. 4-6), the predetermined value L may be transmitted to the UE from the network via upper layer signaling, may be reached by a negotiation between the network and the UE, or may be stored in the UE in advance, for example, using a lookup table or the like, before performing the step S450 or S470. In the embodiment of FIG. 6, the threshold value for determining M may be made similarly available in or provided to the UE for a timely comparison with the measured ACK/NACK reception power.

By adopting the above-described packet transmission method in a mobile station (UE) of a 3GPP standard communications system using a HARQ scheme, the UE communicating with a plurality of base stations transmitting an ACK/NACK feedback signal, can lower a threshold for determining a packet transmission acknowledgment status, that is, whether a received ACK/NACK feedback signal is an ACK signal or a NACK signal, to reduce status determination errors and thereby enable a decrease in transmission power for the ACK/NACK feedback signals. In particular, in performing a DTX operation upon a NACK condition as in FIG. 2 or in failing to receive a packet in a system applying discontinuous transmission as in FIG. 3, the method of the present invention minimizes the number or rate of false ACK signal detections when discontinuous transmission is used to indicate a NACK condition, so that a threshold can be lowered to enable a reduction in ACK/NACK transmission signal power.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of transmitting a packet from a mobile station communicating with N base stations, the method comprising:
   receiving, from the N base stations, ACK signals indicating transmission acknowledgement status for an uplink packet;
   counting the ACK signals, wherein the N base stations apply discontinuous transmission(DTX) technique when failing to receive a packet; and
   transmitting a new packet or a retransmission packet according to the counted number of the ACK signals, wherein the retransmission of the packet is performed when the counted number is less than a predetermined value.

2. The method as claimed in claim 1, wherein transmission of the new packet is performed when the counted number is not less than a predetermined value.

3. The method as claimed in claim 2, further comprising receiving the predetermined value.

4. The method as claimed in claim 3, wherein the predetermined value is received from a network via upper layer signaling.

5. The method as claimed in claim 3, wherein the predetermined value is stored in a memory of the mobile station.

6. The method as claimed in claim 1, wherein the transmission acknowlegment status is determined by a reception voltage level and a reception polarity of the ACK signal.

7. The method as claimed in claim 6, wherein the reception voltage level for ACK is less than a threshold voltage.

8. The method as claimed in claim 7, wherein the reception voltage is detected using a filter in the mobile station, at a point when a reception of the ACK signal is anticipated.

9. The method as claimed in claim 1, wherein the mobile station is in soft handover.

10. A method of transmitting a packet from a mobile station, the method comprising:
   receiving, from the N base stations, ACK signals indicating transmission acknowledgement status for an uplink packet;
   measuring an ACK/NACK reception level from each of the N base stations; selecting at least a base station among the N base stations according to the measured ACK/NACK reception level;
   counting the number of the base station(s) transmitting ACK signal among the selected base stations, wherein the selected base stations apply discontinuous transmission(DTX) technique when failing to receive a packet; and
   transmitting a new packet or a retransmission packet according to the counted number, wherein the retransmission of the packet is performed when the counted number is less than a predetermined value.

11. The method as claimed in claim 10, wherein the reception level is a signal to interference ratio (SIR) level.

12. The method as claimed in claim 10, wherein the reception level is reception power level.

13. The method as claimed in claim 12, wherein the reception power level of each of the selected base stations is greater than the unselected base stations.

14. The method as claimed in claim 13, wherein the retransmission of the new packet is performed when the counted number is not less than a predetermined value.

15. The method as claimed in claim 14, further comprising step of receiving the predetermined value.

16. The method as claimed in claim 15, wherein the predetermined value is received from a network via upper layer signaling.

17. The method as claimed in claim 15, wherein the predetermined value is stored in a memory of the mobile station.

18. The method as claimed in claim 10, wherein the base station transmitting the ACK signal is determined by a reception voltage level and a reception polarity the of ACK signal.

19. The method as claimed in claim 10, further comprising detecting a NACK signal when the reception voltage level is below a threshold.

20. The method as claimed in claim 19, wherein the reception voltage is detected using a filter in the mobile station.

21. The method as claimed in claim 10, wherein the mobile station is in soft handover.

22. The method as claimed in claim 12, wherein selecting base stations from which reception power level is greater than or equal to a selection threshold.

23. The method as claimed in claim 12, wherein if the power levels of base stations are below the selection threshold, the retransmission packet is transmitted.

24. A method of transmitting a packet from a mobile station, the method comprising:
   receiving, from the N base stations, ACK/NACK signals indicating transmission acknowledgement status for an uplink packet;
   measuring an ACK/NACK reception level from each of the N base stations;
   selecting at least a base station comparing the reception level of each N base station with a threshold;
   counting the number of the base stations transmitting ACK signal among the selected base stations, wherein the selected base stations apply discontinuous transmission (DTX) technique when failing to receive a packet; and
   transmitting a new packet or a retransmitting packet according to the counted number, wherein retransmission of the packet is performed when the counted number is less than a predetermined value.

25. The method as claimed in claim 24, wherein the reception level is one of reception power level or signal to interference (SIR) level.

26. The method as claimed in claim 24, wherein the reception level is reception power level.

27. The method as claimed in claim 26, wherein the ACK/NACK reception level of the selected base station is greater than unselected base stations.

28. The method as claimed in claim 24, wherein transmission of the new packet is performed when the counted number is not less than a predetermined value.

29. The method as claimed in claim 28, further comprising receiving the predetermined value.

30. The method as claimed in claim 29, wherein the predetermined value is received from a network via upper layer signaling.

31. The method as claim in claim 24, wherein the base station transmitted ACK signal is determined by reception voltage level and a reception polarity of ACK signal.

32. The method as claimed in claim 31, wherein the reception voltage level for a NACK signal is higher than the reception voltage level for an ACK signal.

33. The method as claimed in claim 24, wherein the reception voltage is detected using a filter in the mobile station, at a point when a reception of the ACK signal is anticipated.

34. The method as claimed in claim 25, wherein the mobile station is in soft handover.

35. A method of transmitting a packet from a mobile station communicating with N base stations, the method comprising:
   determining ACK/NACK status of at least one base station for an uplink packet, based on reception level from at least one base station;
   counting the number of the ACK status, wherein the base stations apply discontinuous transmission(DTX) technique when failing to receive a packet; and
   transmitting a new packet or a retransmission packet according to the counted number, wherein retransmission of the packet is performed when the counted number is less than a predetermined value.

36. The method as claimed in claim 35, the reception level is signal to interference ratio (SIR) level.

37. The method as claimed in claim 35, the reception level is reception power level.

38. The method as claimed in claim 35, further comprising steps of:
   receiving, in a base station, an uplink packet from the mobile station;
   decoding the uplink packet; and
   turning off transmission power of the status signal to the mobile station, when the received packet has been unsuccessfully decoded.

39. The method as claimed in 38, wherein the ACK/NACK status is determined based on a reception voltage level and a reception polarity from at least one base station.

40. The method as claimed in claim 38, further comprising determining the NACK status when a filter in the mobile station does not detect the ACK status signal at a time when the ACK status signal is anticipated.

* * * * *